United States Patent [19]

Glass

[11] Patent Number: 5,764,708

[45] Date of Patent: Jun. 9, 1998

[54] DEVICE FOR IDENTIFYING A PREDETERMINED SEQUENCE OF SIGNALS IN A MODEM

[75] Inventor: William Glass, Seyssinet Pariset, France

[73] Assignee: SGS-Thomson Microelectronics S.A., Saint Genis, France

[21] Appl. No.: 527,058

[22] Filed: Sep. 12, 1995

[30] Foreign Application Priority Data

Sep. 14, 1994 [FR] France ................... 94 11210

[51] Int. Cl.⁶ .................. H03D 1/00; H04L 7/00; H04L 27/06
[52] U.S. Cl. .......... 375/340; 327/47; 364/715.11; 370/514
[58] Field of Search ................ 375/222, 340, 375/231, 344, 345, 365, 368, 371, 373; 327/39, 47; 364/715.11, 724.11; 370/526, 367, 268, 291, 292, 509, 514, 515; 379/406, 410, 411

[56] References Cited

U.S. PATENT DOCUMENTS 4,847,880  7/1989  Kamerman et al. .
4,849,989  7/1989  Kamerman .
5,127,027  6/1992  Takahashi ................... 375/231
5,208,832  5/1993  Greiss ........................ 375/231
5,260,974  11/1993  Johnson et al. ............. 375/340
5,309,476  5/1994  Murray et al. ............... 375/8
5,337,332  8/1994  Yaguchi et al. ............. 375/94

FOREIGN PATENT DOCUMENTS 4-78210  6/1992  Japan .

*Primary Examiner*—Wellington Chin
*Assistant Examiner*—Jean B. Corrielus
*Attorney, Agent, or Firm*—Wolf, Greenfield & Sacks, P.C.; James H. Morris

[57] ABSTRACT

The invention relates to a device for identifying a predetermined sequence of signals arriving on a modem, the sequence having a frequency spectrum of two determined frequencies, the device including a notch filter, associated with a first magnitude calculator having an output sent on a first input of a comparator, a second input of the comparator receiving the output of a second magnitude calculator, the input of which directly receives the signals received by the modem.

27 Claims, 1 Drawing Sheet

DEVICE FOR IDENTIFYING A PREDETERMINED SEQUENCE OF SIGNALS IN A MODEM

BACKGROUND OF THE INVENTION

1. Field of the Invention

The present invention relates to the field of digital modulators/demodulators (modems), and more particularly to the operation of identifying predetermined sequences of instruction words in a start-up phase, or in intermediate training phases of communication. The invention more particularly applies to modem devices and methods used for transmitting faxes.

2. Discussion of the Related Art

In a modem using a signal processor, the data to be transmitted is digitally encoded from a number of possible symbols, then transmitted as samples of portions of a carrier, for example modulated in phase and amplitude, and then converted into analog signals.

The training phases of communication between two modems have the purpose of adjusting the modems essentially according to the transmission line which causes changes in transmit signals that the modem receiver must be able to identify as such in order to decode the data.

The changes can translate, for example, as a frequency offset of the carrier, an amplitude distortion of the modulated signal, noise, an attenuation of the signal, a phase jitter, a timing offset of the modulated symbols, etc.

For transmissions using modems operating in two-way alternate mode (half-duplex), the exchanges of information (data or instructions) are alternatively performed. In other words, one modem transmits while the other receives, and then the other transmits while the first one receives. When the changes of transmission direction are frequent, it is important that the training phases be as short as possible so as not to be a nuisance for the data transmission rate.

The changes due to the line change only slightly for a given modem between two reception periods which are separated by a transmission period. The modem can thus store the parameters corresponding to the changes analyzed during its previous reception period. These parameters are the adaptive equalizer coefficients, the carrier recovery offset frequency, the timing recovery frequency offset, the gain, etc.

A short training phase can thus be used between each data transmission period to readjust the modems with respect to the possible changes since the former training phase.

Such training phases, intended to be the shortest possible, occur in the exchanges between two modems used for transmitting faxes. Such modems operate in half-duplex and are likely to transmit and receive signals in phase and amplitude modulation (QAM) or in differential phase modulation (DPH) of a carrier for the data transmission.

Before each transmission of a document, an initial training phase is carried out, and, before each transmission of a document page, an intermediate training phase is carried out. The CCITT recommendations provide a determined training phase for each transmission standard by determining the type of signal to be transmitted and the maximum duration of the training procedures. In the case of standard V27 ter, for example, which is one of the standards used for QAM modulation fax transmission, the training procedure is divided into five segments.

The five segments correspond to a particular transmission of predetermined signals by the calling modem, which must be recognized and used by the called modem to adapt its different modules and make them fit to correctly receive data. The modem that receives the signals corresponding to these segments must be able to recognize them in time to start the different adaptation processes necessary for its functioning.

A first segment includes a pure carrier (unmodulated) transmitted at the frequency of the data transmission carrier. The frequency is, for example, 1800 Hz for standard V27 ter and the duration of the segment is fixed at from 185 to 200 ms.

A second segment includes no transmission during a certain period. The period is, for example, 20 to 25 ms for standard V27 ter.

The first two segments are present only in the training phases relative to modems having echo cancellation modules.

A third segment includes a signal modulated by a given frequency, in phase and 180° out of phase. The frequency is, for example, 1600Hz for standard V27 ter. This third segment is most important. It is used to adjust an automatic gain command and a time recovery module for recovering the frequency and phase of the transmitted symbol. It is essential that the modem which receives it identifies the third segment so as to be able to correctly receive the transmitted data during the following period. The duration of the third segment depends on the state in which the modems are found, among the two states which respectively correspond to an initial training or to an intermediate training. For standard V27 ter, the intermediate training state, called state a, has a duration of 14 symbol intervals. The initial training state, called state b, has a duration of 50 symbol intervals. The durations are expressed in numbers of symbol intervals, or bauds, because they depend on the transmission rate in bits per second, standard V27 ter providing two transmission speeds (1200 bauds or 2400 bits/s and 1600 bauds or 4800 bits/s).

A fourth segment includes a random scrambled signal in a frequency range. For standard V27 ter at 4800 bits/s, the frequency range is between 1000 and 2600 Hz. Its duration is 58 symbol intervals for option a and 1074 symbol intervals for option b. The segment four is used to adjust an equalizer to make up for the attenuation and the propagation delay of the group linked to the transmission line and the carrier recovery.

A fifth segment includes a scrambled signal encoded in a predetermined way. The duration of this segment is 8 symbol intervals. The segment five is used to synchronize a descrambler for a correct data reception.

The invention relates to the identification of the third segment which, for standard V27 ter at 4800 bits/s, consists of a 1800 Hz carrier modulated by a frequency of 1600 Hz in phase and 180° out of phase. In the frequency range, this corresponds to transmitting two pure frequencies, one of them at 1000 Hz, the other at 2600 Hz.

The choice of segment three for identifying the occurrence of a training phase is based on the fact that the first two are not always present. As a matter of fact, they are only present in training phases related to modems having echo cancellation modules. Besides, the first adaptations of the algorithms of the receiver are performed from segment three, which prohibits the choice of the subsequent segments.

FIG. 1 shows a circuit conventionally used for detecting segment three. The circuit includes a band-pass filter 1 and a low-pass filter 2, each of said filters receiving the signal Rx transmitted by the transmitting modem. The signal Rx received by filters 1 and 2 actually corresponds to the signal received by the modem receiver after digitization in an analog/digital converter (not shown). Each filter 1 or 2 is followed by an energy calculation circuit, respectively 3 and 4. A comparator 5 receives, on a first input, the output of a multiplier 6 multiplying the output of calculation circuit 3 by a coefficient K0, and, on a second input, the output of a multiplier 7 multiplying the output of calculation circuit 4 by a coefficient K1. The output of comparator 5 supplies a two-state DETECT signal indicating the presence or the absence of segment three in the receive signal Rx. Coefficient K0 of multiplier 6 is approximately twice as large as the coefficient K1 of multiplier 7. For standard V27 ter, band-pass filter 1 is a narrow filter centered on a 1000 Hz frequency and low-pass filter 2 has a cut-off at 1760 Hz.

Thus, when segment three is present, i.e. two pure frequencies of 1000 Hz and 2600 Hz, the first input of comparator 5 is at a higher level than its second input. Effectively, twice the output level of band-pass filter 1 is greater than the output level of low-pass filter 2.

In presence of a modulated signal of noise on the line (e.g., flat spectrum between 1000 Hz and 2600 Hz), or of another segment three corresponding to another transmission standard (e.g., a segment three corresponding to standard V29 which corresponds to two pure frequencies of 500 Hz and 2900 Hz), the level of the output of low-pass filter 2 is greater than twice the level of band-pass filter 1, due to the narrowness of the latter.

While this type of detector correctly operates for a segment three of long duration (e.g., state b of standard V27 which corresponds to 50 bauds, that is 31.25 ms), it does not reliably detect segment three if the segment is transmitted only during a short time (e.g., state a of standard V27 which corresponds to 14 bauds, that is 8.75 ms). This is due to the response time of band-pass filter 1, the time constant of which is greater than 14 bauds, because of its narrowness.

Actually, a digital band-pass filter conventionally is a recursive, at least second order, filter constituted by integrators, multipliers and delay elements (shift registers). The structure and behavior of a filter of this type have been discussed by P.-M. BEAUFILS and M. RAMI in "Le filtrage numerique", pages 216 to 224.

A drawback of this type of filter is that obtaining a narrow band-pass filter, which is necessary in order to prevent false detections of segment three, leads to a slow filter.

Another method conventionally used for detecting segment three consists in estimating the energy of the receive signal in a wide frequency range (for example from 300 Hz to 3200 Hz) and regarding segment 3 as received when a predetermined energy threshold is reached. A drawback of this method is that ill-timed triggering occurs due to the presence of other signals of sufficient amplitude such as noise.

Another known method (described in U.S. Pat. No. 5,337,332) consists in detecting the training sequence by examining the demodulated baseband signal. A drawback of such a method is that it needs an additional demodulator and an automatic gain controller to obtain the baseband signal. Another drawback of such a method is that calculation means cannot be shared with other circuits of a conventional modem.

SUMMARY OF THE INVENTION

An object of the invention aims at overcoming these drawbacks by providing a detector for segment three which is both reliable and sufficiently fast, even in the case of a transmission of a segment three of short duration.

Another object of the invention is to provide a detector of segment three which reduce the number of components with respect to the conventional circuit of FIG. 1.

Another object of the invention is to provide such a detector in which some calculation means can be shared with other circuits of the modem.

To achieve these objects, the present invention provides a device for identifying a predetermined sequence of signals arriving on a modem, the sequence having a frequency spectrum of two determined frequencies, the device including a notch filter, associated with a first energy calculation circuit having an output sent on a first input of a comparator, a second input of the comparator receiving the output of a second energy calculation circuit having its input directly receive the signals received by the modem.

According to an embodiment of the invention, a multiplier by a predetermined coefficient is interposed between each energy calculation circuit output and the comparator input with which the calculation circuit is associated.

According to an embodiment of the invention, the coefficient of the multiplier associated with the first calculation circuit is greater than the coefficient of the multiplier associated with the second energy calculation circuit.

According to an embodiment of the invention, the notch filter is a two zero fourth order filter.

According to an embodiment of the invention, each magnitude calculation circuit comprises a circuit for determining the absolute value of the magnitude of the receive signal and a digital recursive first order low-pass filter with a zero cut-off frequency, forming an averaging block.

According to an embodiment of the invention, the frequency of the carrier is 1800 Hz and the cut-off frequencies of the notch filter are respectively 1000 Hz and 2600 Hz.

The foregoing and other objects, features and advantages of the present invention will become apparent from the following description when taken in conjunction with the accompanying drawings. It is to be understood that the drawings are designed for the purpose of illustration only and are not intended as a definition of limits of the invention.

DETAILED DESCRIPTION

Figure 1:
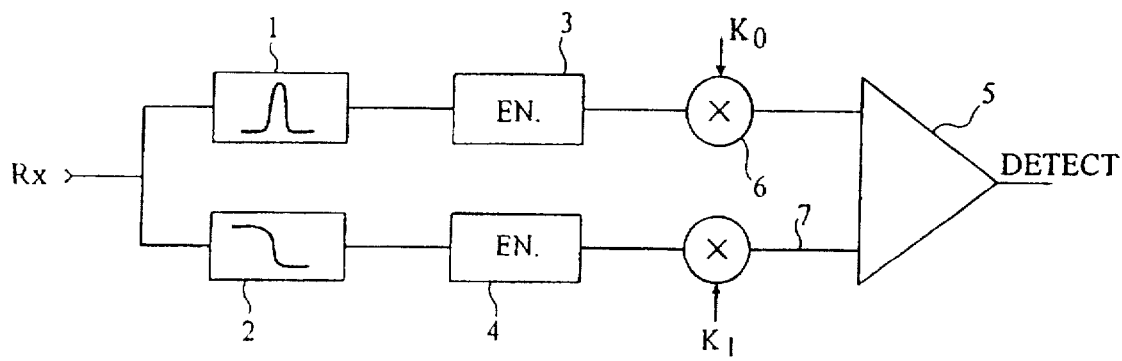
FIG. 1, as previously described, discloses a conventional detector.
Figure 2:
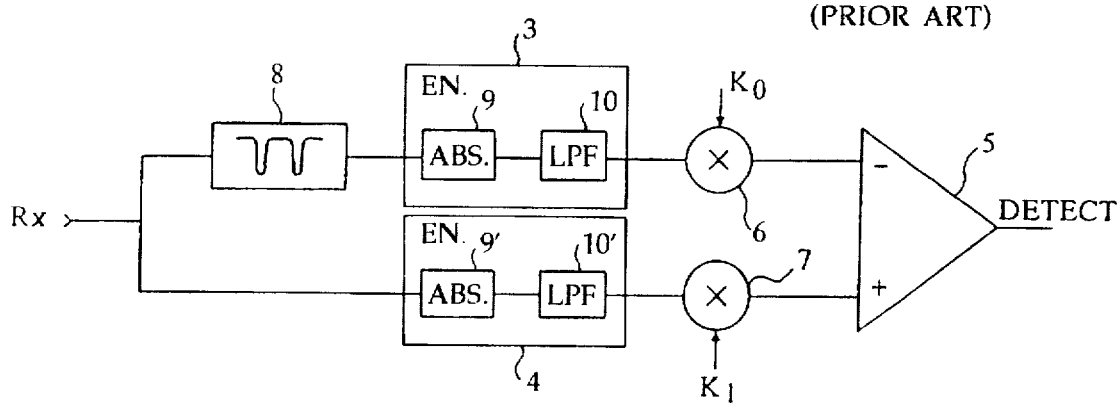
FIG. 2 illustrates an embodiment of an identification device according to the invention.

Referring to FIG. 2, the recognition device according to the invention includes a notch filter 8 on which the signal Rx received by the modem is sent after being digitized. The output of notch filter 8 is sent to a first magnitude calculation circuit 3, having its output coupled to a first input of a comparator 5. The receive signal Rx is also directly sent on a second magnitude calculation circuit 4, having its output coupled to a second input of comparator 5. Preferably, multipliers, respectively 6 and 7, are interposed between the output of each calculation circuit 3, 4 and the input of the comparator with which it is associated. The multipliers 6 and 7 multiply by a positive coefficient lower than 1, respectively K0 and K1, to each output of calculation circuit 3 or 4, K0 being greater than K1.

The magnitude calculation circuits 3, 4 are constituted by a circuit 9, 9', respectively, for determining the absolute value (ABS) of the amplitude of the receive signal and a digital recursive first order low-pass filter (LPF) 10, 10', respectively, with a zero cut-off frequency, forming an averaging block.

According to the invention, a magnitude calculation circuit is preferred because of its implementation facility with respect to an energy calculation circuit squaring the level of the receive signal.

Notch filter 8 includes two cut-off frequencies which correspond to the two frequencies present in segment three, e.g., for standard V27 ter, 1000 Hz and 2600 Hz.

An advantage of using such a notch filter 8 is that it is easy to implement in the form of a non-recursive filter having a small time constant. This does not occur for a band-pass filter, since a non-recursive filter includes only zeros (frequencies for which the attenuation is infinite). Hence, the number of delay elements of the band-pass filter would have to be multiplied in order to surround the central frequency with a great number of zeros (cut-off frequencies), since the obtaining of a determined non cut-off frequency is desired, which would lead to a very high propagation delay for the signal in the band-pass filter. In contrast, for a notch filter, the frequencies determined are precisely cut-off frequencies, that is, zeros.

By means of a device as shown in FIG. 2, the presence of segment three causes a high energy level at the output of calculation circuit 4 which receives signal Rx straight through, and a very low energy level at the output of calculation circuit 3, since the two frequencies have been cut-off by filter 8. The noise likely to be intermixed with the receive signal Rx has no effect here, since its contribution is practically the same on the two energy calculation circuits 3 and 4, because the notch filters are relatively narrow.

In the absence of segment three, that is, in presence of a modulated signal, noise, or a segment three corresponding to another transmission standard, the outputs of the two calculation circuits 3 and 4 are roughly at the same levels.

The coefficients of multipliers 6 and 7 are preferably selected so that the output level of calculation circuit 4 be divided by two with respect to the output level of calculation circuit 3. This enables easy discrimination of the two possible cases by comparator 5, i.e., one of the two inputs of the comparator always has one of its levels higher than the other (the first one in the absence of segment three, the second one when segment three is present).

The device according to the invention thus allows a reliable and fast detection of the occurrence of segment three in a training phase. The time constant of the device according to the invention corresponds to the time constant of notch filter 8 increased by the time constant of calculation circuits 3 and 4.

As an example, a non-recursive fourth order notch filter 8 enables good filter accuracy while allowing a detection of segment three even in the case of state a of standard V27 ter.

Figure 3:
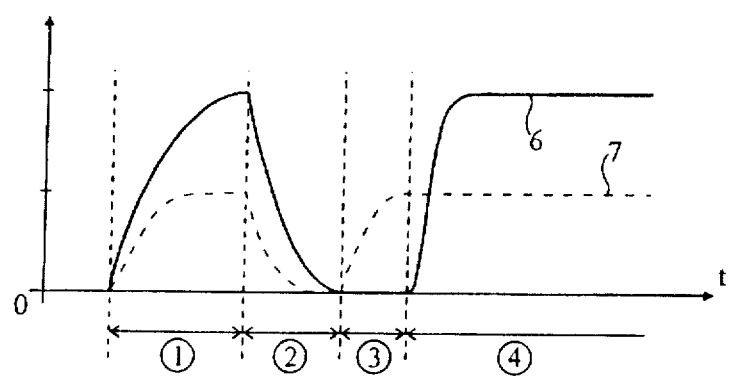
FIG. 3 illustrates time diagrams of the waveforms of some signals of the device according to the invention.

FIG. 3 shows time diagrams of the functioning of the invention. It shows the input levels of comparator 5, i.e., the output levels of multipliers 6 and 7 which represent the output levels of calculation circuits 3 and 4 assigned with multiplying coefficients K0 and K1.

The various segments have been indicated on the x-axis by circled numerals.

As can be observed, segment three is perfectly identifiable by comparing the output of notch filter 8 with the receive signal Rx. Clearly apparent on FIG. 3 is the fact that during the presence of segment three, the output level of calculation circuit 3 multiplied with coefficient K0 is lower than the output level of calculation circuit 4 multiplied with coefficient K1, whereas the opposite happens in all other segments.

During segment one, if it exists in the training phase, the receive signal Rx is a pure carrier, for example at a frequency of 1800 Hz. Thus, said frequency is not cut-off by filter 8 and the output levels of calculation circuits 3 and 4 are identical. Multiplying these levels by the coefficients, respectively K0 and K1, leads to having a level of the first input of comparator 5 higher than the level of its second input.

During segment two, if it exists in the training phase, no signal is transmitted. Hence, the output levels of calculation circuits 3 and 4 are identical again. This remains true even when there is noise, since the contribution of the noise will essentially be the same on the two levels issued by calculation circuits 3 and 4.

During segment three, the receive signal Rx corresponds to two pure frequencies, for example 1000 Hz and 2600 Hz. Said frequencies being cut-off by filter 8, the output level of calculation circuit 3 cancels, to within the noise level, whereas the output level of calculation circuit 4 corresponds to the total level of signal Rx. Thus, the level of the first input of comparator 5 will be lower than the level of its second input. The contribution of the possible noise is always substantially the same on both magnitude levels.

During segments four and five, the receive signal Rx is a scrambled signal. Thus, the output levels of calculation circuits 3 and 4 will be substantially the same. The multiplying of these levels by the coefficients, respectively K0 and K1, leads, as for segments one and two, to a level of the first input of comparator 5 higher than the level of its second input.

An advantage of the present invention is that, using the received signal Rx before its demodulation, the detector does not need any additional circuit (demodulator, etc.). Furthermore, the detection of segment three is made as upstream as possible, that is, at the output of the analog/digital converter.

Another advantage of the present invention is that the calculation circuit 4 can be shared with other circuits of the modem using a magnitude calculation circuit of the Rx signal before demodulation, for example, a carrier loss detector.

Another advantage of the present invention, also because it uses the receive signal before demodulation, is that the calculation circuit 3 gives additional information on the magnitude level during segment three. Such information could be used, for example, for testing the level of segment three which has a calibrated amplitude.

Of course, the present invention is likely to have various alterations and modifications which will readily occur to those skilled in the art and which are intended to be within the scope of the invention. Particularly, each of the described components can be replaced by one or several elements assuming the same function.

Moreover, whereas some of the foregoing explanations have been given for the sake of clarity by using terms which sometimes corresponds to an analog operation, it will be clear to those skilled in the art that all the elements of the circuit according to the present invention deal with digital signals and that the components of the circuit illustrated in a material form can correspond, in the practice, to software implementations performed, for example, on a computer.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A device for identifying a predetermined sequence of modulated signals arriving on a modem, the predetermined sequence having a frequency spectrum that includes a first frequency and a second frequency, the device comprising:

a comparator;

a notch filter that receives the predetermined sequence of modulated signals;

a first magnitude calculation circuit serially connected to the notch filter, an output of which is coupled to a first input of the comparator; and a second magnitude calculation circuit, an input of which directly receives the predetermined sequence of modulated signals from the modem, and an output of which is coupled to a second input of the comparator.

2. The device for identifying the predetermined sequence of modulated signals according to claim 1, further including:

a first multiplier, interposed between the output of the first magnitude calculation circuit and the first input of the comparator that multiplies the output of the first magnitude calculation circuit by a first predetermined coefficient; and a second multiplier, interposed between the output of the second magnitude calculation circuit and the second input of the comparator that multiplies the output of the second magnitude calculation circuit by a second predetermined coefficient.

3. The device for identifying the predetermined sequence of modulated signals according to claim 2, wherein the first predetermined coefficient of the first multiplier associated with the first magnitude calculation circuit is greater than the second predetermined coefficient of the second multiplier associated with the second magnitude calculation circuit.

4. The device for identifying the predetermined sequence of modulated signals according to claim 3, wherein the notch filter provides a notch filter signal, wherein the first and the second magnitude calculation circuits include a determining circuit that determines an absolute value of a magnitude of the notch filter signal and the predetermined sequence of modulated signals, respectively, and a digital recursive first order low-pass filter with a zero cut-off frequency, forming an averaging block.

5. The device for identifying the predetermined sequence of modulated signals according to claim 1, wherein the notch filter is a non-recursive digital filter with two cut-off frequencies.

6. The device for identifying the predetermined sequence of modulated signals according to claim 5, wherein the notch filter is a fourth order filter with two zeros.

7. The device for identifying the predetermined sequence of modulated signals according to claim 6, wherein a carrier frequency of the predetermined sequence of modulated signals is 1800 Hz, and wherein the two cut-off frequencies of the notch filter are 1000 Hz and 2600 Hz.

8. The device for identifying the predetermined sequence of modulated signals according to claim 6, wherein the notch filter provides a notch filter signal, wherein the first and the second magnitude calculation circuits include a determining circuit that determines an absolute value of a magnitude of the notch filter signal and the predetermined sequence of modulated signals, respectively, and a digital recursive first order low-pass filter with a zero cut-off frequency, forming an averaging block.

9. The device for identifying the predetermined sequence of modulated signals according to claim 1, wherein the notch filter provides a notch filter signal, wherein the first and the second magnitude calculation circuits include a determining circuit that determines an absolute value of a magnitude of the notch filter signal and the predetermined sequence of modulated signals, respectively, and a digital recursive first order low-pass filter with a zero cut-off frequency, forming an averaging block.

10. A device for identifying a particular signal having a first signal portion that defines a first frequency, and a second signal portion that defines a second frequency, the device comprising:

a notch filter having an input that receives a modulated input signal, and an output that provides a filtered signal substantially equaling the modulated input signal with a first attenuated portion corresponding to the first frequency and a second attenuated portion corresponding to the second frequency;

a first intermediate circuit having an input coupled to the output of the notch filter, and an output that provides a first intermediate signal according to a first calculation;

a second intermediate circuit having an input that receives the modulated input signal, and an output that provides a second intermediate signal according to a second calculation; and a comparator having a first input coupled to the output of the first intermediate circuit, a second input coupled to the output of the second intermediate circuit, and an output that provides output signal according to the first and second intermediate signals, the output signal being indicative of whether the modulated input signal is the particular signal.

11. The device of claim 10, wherein the notch filter is constructed and arranged to attenuate the modulated input signal so that the filtered signal substantially equals the modulated input signal with the first attenuated portion and the second attenuated portion, each of the first and the second attenuated portions of the filtered signal being substantially zero.

12. The device of claim 11, wherein the first and second frequencies are 1000 Hz and 2600 Hz, respectively.

13. The device of claim 10, wherein the notch filter includes a non-recursive digital filter having a predetermined time constant.

14. The device of claim 10, wherein the first intermediate circuit performs a first calculation according to a first predetermined value, and wherein the second intermediate circuit performs a second calculation according to a second predetermined value, the first predetermined value being greater than the second predetermined value.

15. The device of claim 10, wherein the first intermediate circuit includes multiplication circuitry that multiplies the first intermediate signal by a first predetermined value, and wherein the second intermediate circuit includes multiplication circuitry that multiplies the second intermediate signal by a second predetermined value, the second predetermined value being substantially half the first predetermined value.

16. The device of claim 10, wherein the notch filter is a non-recursive, fourth order, digital filter with two zeros.

17. A device for identifying a particular signal having a first signal portion that defines a first frequency, and a second signal portion that defines a second frequency, the device comprising:

filtering means for receiving a modulated input signal, and providing a filtered signal substantially equaling the modulated input signal with a first attenuated portion corresponding to the first frequency and a second attenuated portion corresponding to the second frequency;

a first intermediate circuit having an input that receives the filtered signal from the filtering means, and an output that provides a first intermediate signal according to a first calculation;

a second intermediate circuit having an input that receives the modulated input signal, and an output that provides a second intermediate signal according to a second calculation; and a comparator having a first input coupled to the output of the first intermediate circuit, a second input coupled to the output of the second intermediate circuit, and an output that provides an output signal according to the first and second intermediate signals, the output signal being indicative of whether the modulated input signal is the particular signal.

18. The device of claim 17, wherein the filtering means is constructed and arranged to attenuate the modulated input signal so that the filtered signal substantially equals the modulated input signal with the first attenuated portion and the second attenuated portion, each of the first and the second attenuated portions of the filtered signal being substantially zero.

19. The device of claim 18, wherein the first and second frequencies are 1000 Hz and 2600 Hz, respectively.

20. The device of claim 17, wherein the filtering means includes a non-recursive digital filter having a predetermined time constant.

21. The device of claim 17, wherein the first intermediate circuit performs a first calculation according to a first predetermined value, and wherein the second intermediate circuit performs a second calculation according to a second predetermined value, the first predetermined value being greater than the second predetermined value.

22. The device of claim 17, wherein the first intermediate circuit includes multiplication circuitry that multiplies the first intermediate signal by a first predetermined value, and wherein the second intermediate circuit includes multiplication circuitry that multiplies the second intermediate signal by a second predetermined value, the second predetermined value being substantially half the first predetermined value.

23. The device of claim 17, wherein the filtering means is a non-recursive, fourth order, digital filter with two zeros.

24. A method for identifying a particular signal having a first signal portion that defines a first frequency, and a second signal portion that defines a second frequency, the device comprising the steps of:

filtering a modulated input signal to produce a filtered signal substantially equaling the modulated input signal with an first attenuated portion corresponding to the first frequency and an second attenuated portion corresponding to the second frequency; providing a first intermediate signal according to a first calculation of the filtered signal with a first predetermined value;

providing a second intermediate signal according to a second calculation of the modulated input signal with a second predetermined value; and comparing the first intermediate signal to the second intermediate signal to provide an output signal, the output signal being indicative of whether the modulated input signal is the particular signal.

25. The method of claim 24, wherein the step of filtering includes the step of:

attenuating the modulated input signal so that the filtered signal substantially equals the modulated input signal with the first attenuated portion and the second attenuated portion, each of the first and the second attenuated portions of the filtered signal being substantially zero.

26. The method of claim 24, wherein the step of providing the first intermediate signal includes the step of multiplying the first intermediate signal by a first predetermined value, and wherein the step of providing the second intermediate signal includes the step of multiplying the second intermediate signal by a second predetermined value, the second predetermined value being substantially half the first predetermined value.

27. A device for identifying a predetermined sequence of modulated signals arriving on a modem, the predetermined sequence having a frequency spectrum that includes a first frequency and a second frequency, the device comprising:

a comparator;

a notch filter that receives the predetermined sequence of modulated signals;

a first energy calculation circuit serially connected to the notch filter, an output of which is coupled to a first input of the comparator; and a second energy calculation circuit, and input of which directly receives the predetermined sequence of modulated signals from the modem, and an output of which is coupled to a second input of the comparator.

* * * * *